(12) United States Patent
Huang

(10) Patent No.: US 8,888,292 B2
(45) Date of Patent: Nov. 18, 2014

(54) PROJECTION APPARATUS FOR PROVIDING MULTIPLE VIEWING ANGLE IMAGES

(75) Inventor: Junejei Huang, Taoyuan Hsien (TW)

(73) Assignee: Delta Electronics, Inc. (TW)

(*) Notice: Subject to any disclaimer, the term of this patent is extended or adjusted under 35 U.S.C. 154(b) by 330 days.

(21) Appl. No.: 13/600,924

(22) Filed: Aug. 31, 2012

(65) Prior Publication Data
US 2013/0301010 A1 Nov. 14, 2013

(30) Foreign Application Priority Data

May 10, 2012 (TW) .............................. 101116590 A

(51) Int. Cl.
| | | |
|---|---|---|
| G03B 21/14 | (2006.01) | |
| G03B 21/28 | (2006.01) | |
| H04N 5/74 | (2006.01) | |
| G02B 1/10 | (2006.01) | |
| G02F 1/1335 | (2006.01) | |
| G02B 27/26 | (2006.01) | |
| G02B 27/10 | (2006.01) | |

(52) U.S. Cl.
CPC ............ *G02B 27/26* (2013.01); *G02B 27/1046* (2013.01)
USPC ............... 353/20; 353/81; 348/771; 348/767; 359/583; 349/96; 349/194

(58) Field of Classification Search
CPC .... G02B 27/283; G02B 27/26; G02B 6/2706; G02B 6/276; G02B 6/2773; G02B 27/1046; H04N 9/3197; H04N 9/315; H04N 9/3105; H04N 5/7441
USPC ............... 353/20, 81; 348/771, 767; 359/583; 349/96, 194
See application file for complete search history.

(56) References Cited

U.S. PATENT DOCUMENTS

| | | | | |
|---|---|---|---|---|
| 5,975,703 | A | * | 11/1999 | Holman et al. ................. 353/20 |
| 6,520,643 | B1 | * | 2/2003 | Holman et al. ................. 353/20 |
| 7,926,949 | B1 | | 4/2011 | Boothroyd |
| 8,025,416 | B2 | | 9/2011 | Oakley |
| 2003/0117357 | A1 | * | 6/2003 | Florence ......................... 345/88 |
| 2003/0184864 | A1 | * | 10/2003 | Bruzzone et al. ............. 359/495 |
| 2007/0247594 | A1 | | 10/2007 | Tanaka |
| 2007/0273798 | A1 | * | 11/2007 | Silverstein et al. ........... 348/752 |
| 2008/0192152 | A1 | * | 8/2008 | Facius et al. .................. 348/750 |
| 2010/0328433 | A1 | * | 12/2010 | Li ................................... 348/46 |

FOREIGN PATENT DOCUMENTS

| | | |
|---|---|---|
| CN | 200510011853.6 | 1/2006 |
| TW | 086103519 | 4/1998 |
| TW | 094113319 | 1/2007 |
| TW | 090204269 | 1/2012 |

* cited by examiner

*Primary Examiner* — Georgia Y Epps
*Assistant Examiner* — Magda Cruz
(74) *Attorney, Agent, or Firm* — Lowe Hauptman & Ham, LLP

(57) ABSTRACT

A projection apparatus is disclosed. The projection apparatus includes a light source module, a first light splitting element, a first light valve unit, a first light modulator, a second light modulator and a light consolidating element. A light beam is provided by the light source module, and is split into a first and a second polarized light beam by the first light splitting element. In different time sequences, the first and the second polarized light beams are formed into a first, a second, a third and a fourth image light by the first light valve unit. Then, these image lights are transformed into viewing angle images by the first and the second light modulators. Then, via the light consolidating element, the first, the second, the third and the fourth view angle images are projected to a viewer and a stereoscopic image is formed.

16 Claims, 13 Drawing Sheets

| Image positions | | Light valve units (63A,63B,63C) |
|---|---|---|
| 1 | First light modulator 64 | (1,0,1) |
| 2 | | (1,1,1) |
| 3 | | (0,0,0) |
| 4 | | (0,1,0) |
| 5 | Second light modulator 65 | (1,1,1) |
| 6 | | (1,0,1) |
| 7 | | (0,1,0) |
| 8 | | (0,0,0) |

FIG. 7A

| Image positions | | Light valve units (63A,63B,63C) |
|---|---|---|
| 1 | First light modulator 64 | (1,0,0) |
| 2 | | (1,1,0) |
| 3 | | (0,0,1) |
| 4 | | (0,1,1) |
| 5 | Second light modulator 65 | (1,1,0) |
| 6 | | (1,0,0) |
| 7 | | (0,1,1) |
| 8 | | (0,0,1) |

FIG. 7B

PROJECTION APPARATUS FOR PROVIDING MULTIPLE VIEWING ANGLE IMAGES

CROSS-REFERENCES TO RELATED APPLICATIONS

This application claims priority to Taiwan Patent Application No. 101116590 filed on May 10, 2012, which is hereby incorporated herein by reference in its entirety.

BACKGROUND OF THE INVENTION

1. Field of the Invention

The present invention relates to a projection apparatus, and more particularly, to a projection apparatus for providing multiple viewing angle images.

2. Descriptions of the Related Art

To obtain more vivid and realistic images, corresponding displaying technologies have been developed in succession over recent years to satisfy the viewers' demands. In contrast to early-stage flat panel displays which mainly focus on the improvement of the resolution and colors, the three-dimensional (3D) display apparatuses that have appeared in recent years aim to provide the viewers with a vivid stereoscopic displaying effect.

The stereoscopic displaying effect is achieved primarily by feeding different viewing angle images of an object to the left and the right eyes respectively. According to the vision characteristics of human eyes, when the left and the right eyes receive two images with the same image contents but different parallaxes simultaneously, a 3D image of the object with a sense of level and depth will be perceived by the viewer.

In practice, 3D images are generally viewed either by use of glasses or by the naked eyes; and the trend of technical developments in recent years has moved to the latter. Furthermore, when being viewed with the naked eyes, the images could be viewed in a time multiplex mode or a spatial multiplex mode. The following description gives a brief introduction of the two types.

FIG. 1 is a schematic view of a conventional projection-type stereoscopic display apparatus 1 adopting the time multiplex mode. As shown, the stereoscopic display apparatus 1 adopting the time multiplex mode comprises a plurality of strip-like light sources 11 disposed adjacent to each other, a Fresnel lens 12 and a liquid crystal display (LCD) panel 13. The strip-like light sources 11 each provide a light beam to the Fresnel lens 12 sequentially. The light beam is imaged by the Fresnel lens 12 onto the corresponding viewing zone. However, because one light source can only provide one viewing angle in the aforesaid stereoscopic image displaying technology adopting the time multiplex mode, the number of viewing angles that can be provided is limited by the number of the stripes of the light source. Consequently, with the limitation of the light sources, the resolution of the projector is hard to improve.

FIG. 2 is a schematic view of another conventional projection-type stereoscopic display apparatus 2 adopting the time multiplex mode. As shown, the display apparatus 2 comprises a light source 21, a polarizer 23, a rotary polygonal mirror 25, a panel 27 and a plurality of optical components 29. The light source 21 generates a light beam that is polarized by the polarizer 23 and then reflected by the rotary polygonal mirror 25 onto the panel 27. With the rotation of the rotary polygonal mirror 25, the light source 21 acts as a scanning line light source on the front end of the optical components 29. Then, the optical components 29 project the images of different viewing angles to different viewing zones according to a time sequence. More specifically, the light source 21 generates a first viewing angle image, a second viewing angle image, a third viewing angle image and a fourth viewing angle image on adjacent viewing zones of the panel 27 in different time sequences. However, this projection-type stereoscopic display apparatus requires use of a rotary polygonal mirror 25 to realize the above said results. In addition, the rotary polygonal mirror 25 mostly functions in a mechanical way, so considerable noises are produced due to the friction. Moreover, with the increasing demand for improved resolution, more viewing angles shall be provided, and thereby, the rotation speed of the rotary polygonal mirror 25 must be increased, which makes the aforesaid shortcoming more prominent.

Accordingly, it is highly desirable in the art to provide a stereoscopic display apparatus with advantages such as a higher light utilization factor, no use of mechanical operating elements, a low cost, a simplified optical arrangement and a high resolution and without the above said shortcomings and problems.

SUMMARY OF THE INVENTION

The present invention relates to a projection apparatus for providing multiple viewing angle images. The projection apparatus comprises a light source module, a first light splitting element, a first light valve unit, a first light modulator, a second light modulator and a light consolidating element. The light source module of the projection apparatus is adapted to provide a light beam. After reaching the first light splitting element, the light beam is divided by the first light splitting element into a first polarized light beam and a second polarized light beam. In different time sequences, the first and the second polarized light beams passing through the first light valve unit are formed into different image lights.

In a first time sequence, the first light valve unit transforms the first and the second polarized light beams into a first and a second image light respectively. Then, the first light modulator and the second light modulator receive the first image light and the second image light respectively and then transform the first image light and the second image light into a first viewing angle image and a second viewing angle image respectively. Finally, the first viewing angle image and the second viewing angle image are projected by the light consolidating element onto a screen so that the images of two viewing angles can be seen by a user in the first time sequence.

In a second time sequence, the first light valve unit transforms the first and the second polarized light beams into a third and a fourth image light respectively. Then, the first light modulator and the second light modulator receive the third image light and the fourth image light respectively and then transform the third image light and the fourth image light into a third viewing angle image and a fourth viewing angle image respectively. Finally, the third viewing angle image and the fourth viewing angle image are projected by the light consolidating element onto a screen so that the images of two viewing angles can be seen by the user in the second time sequence.

Thereby, the user can receive different viewing angle images in different time sequences to obtain a stereoscopic image without the need of using any additional auxiliary device (e.g., a pair of glasses).

An objective of the present invention is to provide a projection apparatus that increased light utilization.

Another objective of the present invention is to provide a projection apparatus that features a low cost and a simplified component arrangement and that eliminates the need of a mechanical rotary member.

A further objective of the present invention is to provide a projection apparatus having a high resolution.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 7A is a schematic view illustrating correspondence relationships between image positions of a first projection lens of a projection apparatus of FIG. 6 and switch statuses of light valve units;

FIG. 7B is a schematic view illustrating correspondence relationships between image positions of a second projection lens of the projection apparatus of FIG. 6 and the switch statuses of the light valve units;

DESCRIPTION OF THE PREFERRED EMBODIMENT

In the following descriptions, the present invention will be explained with reference to embodiments thereof. The present invention relates to a projection apparatus for providing multiple viewing angle images. It shall be appreciated that, in the following embodiments and the attached drawings, description of these embodiments is only for purpose of illustration rather than to limit the present invention. Meanwhile, in the following embodiments and the attached drawings, elements not directly related to the present invention are omitted from depiction; and dimensional relationships among and the numbers of individual elements in the attached drawings are illustrated only for ease of understanding but not to limit the actual scale, the actual sizes and the actual numbers.

Figure 1:
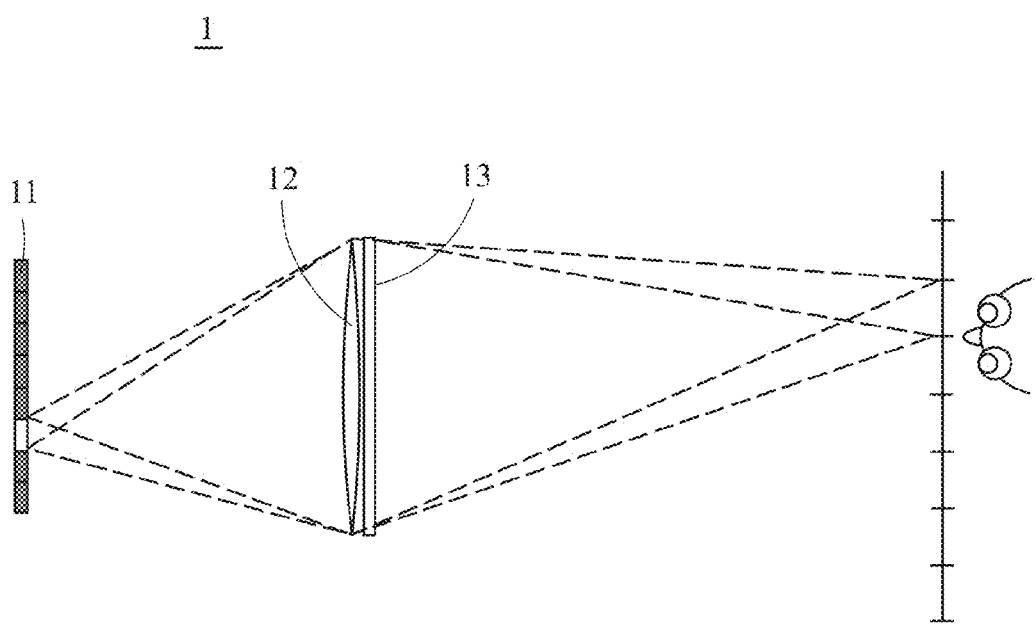
FIG. 1 is a schematic view of a conventional projection-type stereoscopic display apparatus adopting the time multiplexing mode.
Figure 2:
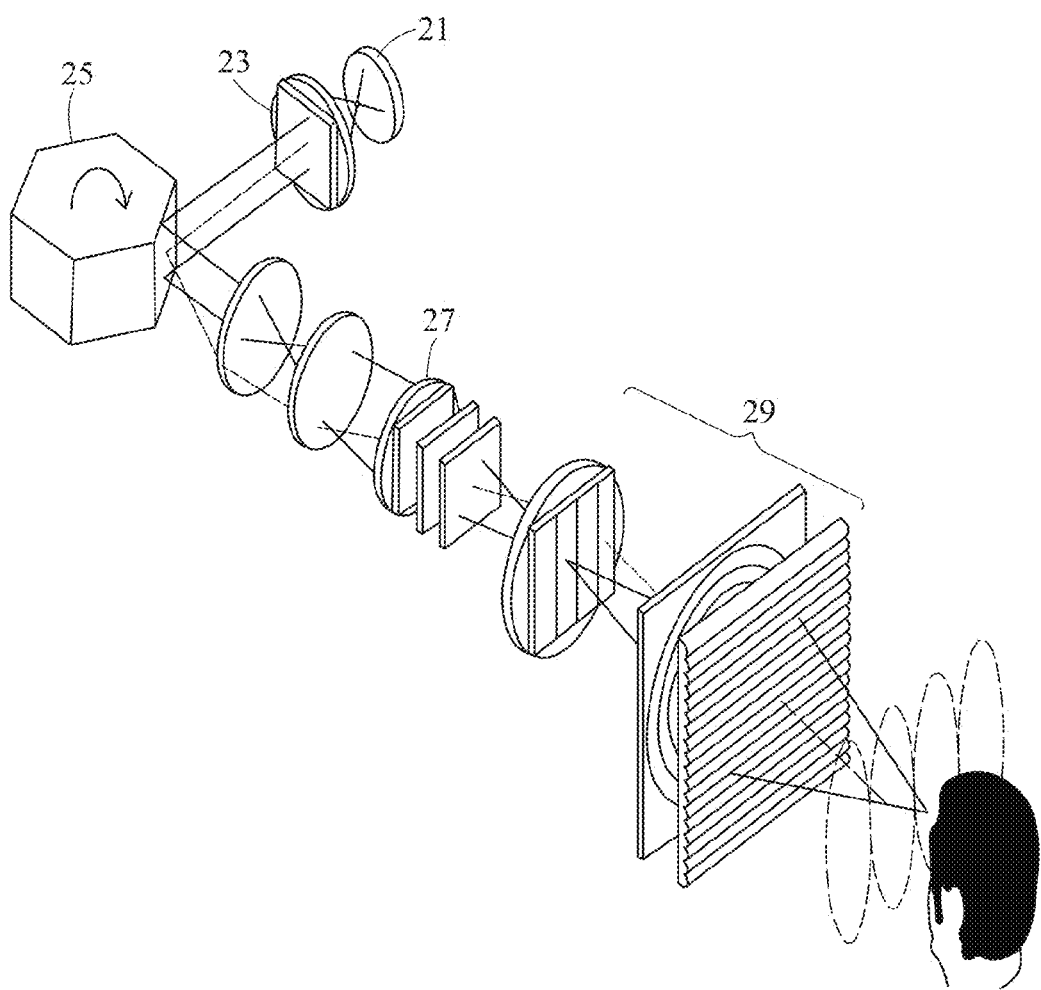
FIG. 2 is a schematic view of another conventional projection-type stereoscopic display apparatus adopting the time multiplexing mode.
Figure 3A:
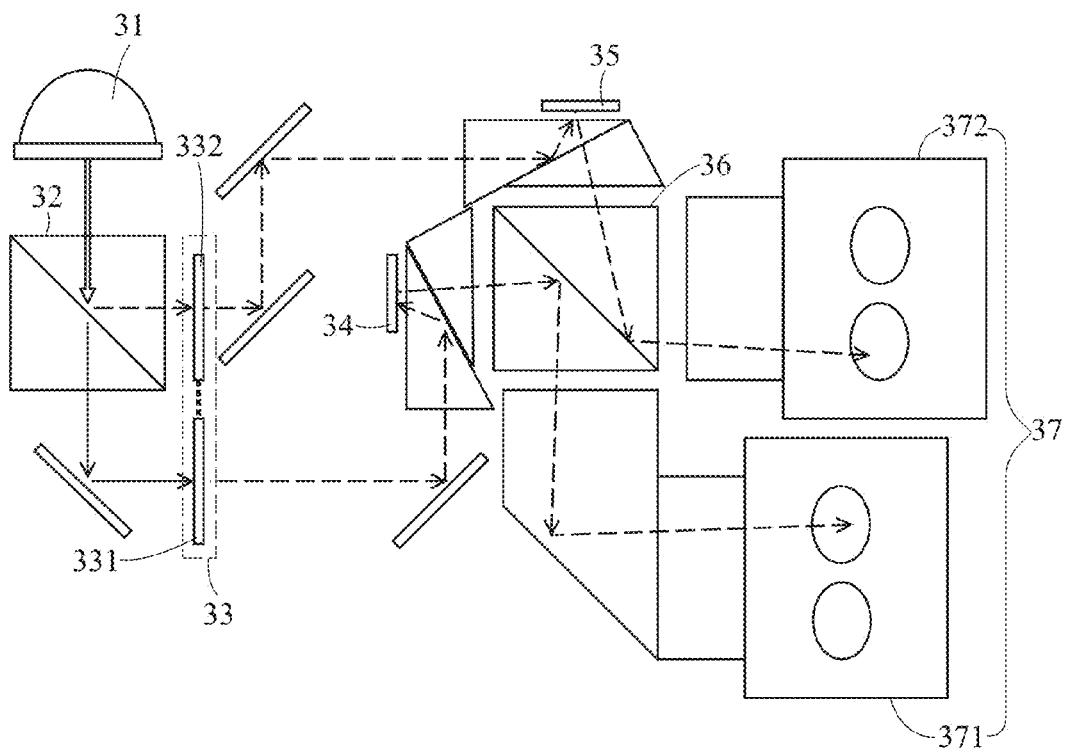
FIG. 3A is a schematic view illustrating a light path of a first embodiment of the present invention in a first time sequence.
Figure 3B:
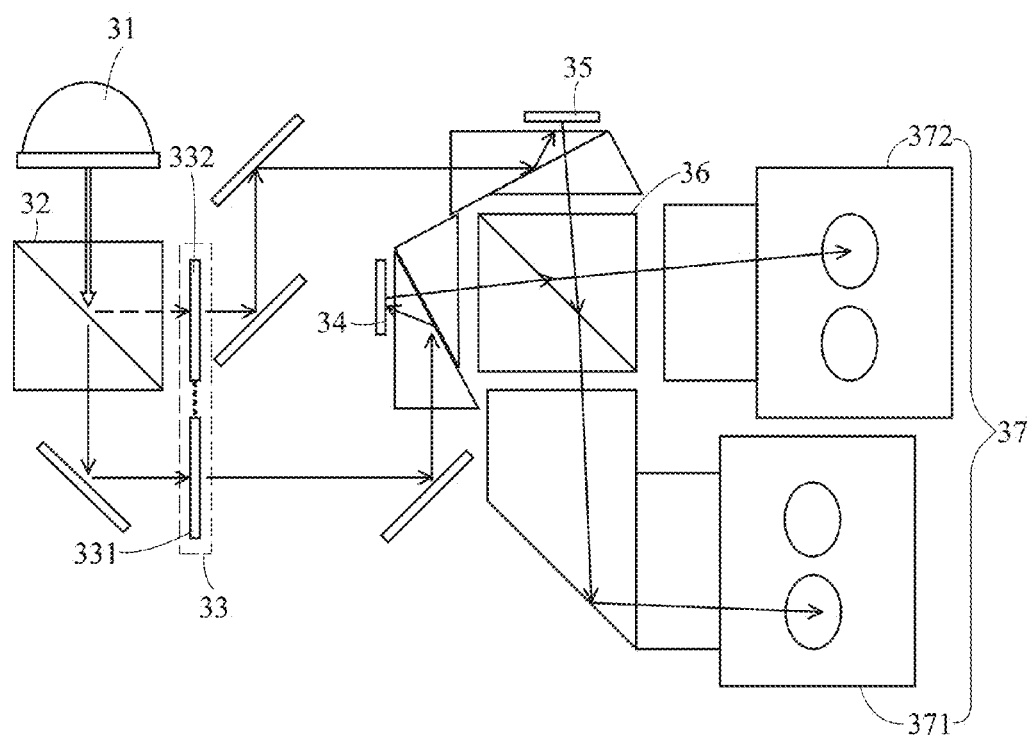
FIG. 3B is a schematic view illustrating a light path of the first embodiment of the present invention in a second time sequence.

Referring firstly to FIG. 3A and FIG. 3B, there are shown schematic views illustrating light paths of a projection apparatus 3 according to a first embodiment of the present invention in a first time sequence and a second time sequence respectively. This embodiment is a projection apparatus 3 for providing multiple viewing angle images, and the projection apparatus 3 comprises a light source module 31, a first light splitting element 32, a first light valve unit 33, a first light modulator 34, a second light modulator 35, a light consolidating element 36 and a projection lens 37.

The light source module 31 of this embodiment may be a high-pressure mercury lamp. The first light splitting element 32 and the light consolidating element 36 are each a polarizing beam splitter. Each of the polarizing beam splitters allows a light beam of a first polarization direction to pass therethrough and reflects a light beam of a second polarization direction, so the light beams of different polarization directions exit from the polarizing beam splitter in different directions.

The first light valve unit 33 of this embodiment comprises a first sub-light valve unit 331 and a second sub-light valve unit 332. The first sub-light valve unit 331 operates in reverse to the second sub-light valve unit. It shall be appreciated that, "operate in reverse" described herein means that if the first sub-light valve unit 331 is in an ON status, then the second sub-light valve unit 332 is in an OFF status, or vice versa. The first light valve unit 33 may be a liquid crystal display, a π-cell, a Ferro-electric liquid crystal (FLC), a Pockels cell, a Kerr shutter or a Faraday crystal.

The first light modulator 34 and the second light modulator 35 of this embodiment may each be a digital micro-mirror device or a liquid crystal device. The projection lens 37 comprises a first projection lens 371 and a second projection lens 372.

Next, the operating process of the projection apparatus 3 will be described. For ease of understanding and description, the operating process of the projection apparatus 3 will be described on the basis of the following definitions: according to different operating modes of the first light valve unit 33, a status in which the first sub-light valve unit 331 of the first light valve unit 33 is in the ON status is defined as a first time sequence and a status in which the first sub-light valve unit 331 of the first light valve unit 33 is in the OFF status is defined as a second time sequence. These definitions are only for convenience of description but not to limit the operating sequence. In practical operations, the projection apparatus 3 switches between the first time sequence and the second time sequence alternately.

As shown in FIG. 3A, the light source module 31 generates a light beam. After reaching the first light splitting element 32, the light beam is split by the first light splitting element 32 into a first polarized light beam and a second polarized light beam. In detail, the first light splitting element 32 allows the first polarized light beam (shown by solid arrows) having the first polarization direction to pass therethrough and reflects the second polarized light beam (shown by dashed arrows) having the second polarization direction. In this embodiment, the light beam having the first polarization direction is a P polarized light that passes through a polarizing coating of the first light splitting element 32, and the light beam having the second polarization direction is an S polarized light that is reflected by the polarizing coating of the first light splitting element 32.

In the first time sequence, the first polarized light beam enters into the first sub-light valve unit 331 of the first light valve unit 33 and is then formed into a first image light. At this point, the first sub-light valve unit 331 is in the ON status. In other words, the first sub-light valve unit 331 can transform the first polarized light beam into the first image light having the second polarization direction. Meanwhile, the second polarized light beam enters into the second sub-light valve unit 332 of the first light valve unit 33. At this point, the second sub-light valve unit 332 is in the OFF status. In other words, the second sub-light valve unit 332 does not change the polarization direction of the second polarized light beam passing therethrough, and the second polarized light beam is formed into a second image light having the second polarization direction.

Then, the first image light and the second image light propagate to the first light modulator 34 and the second light modulator 35 respectively and are transformed into a first viewing angle image and a second viewing angle image by the first light modulator 34 and the second light modulator 35 respectively. Finally, the first viewing angle image and the second viewing angle image are transmitted by the first light modulator 34 and the second light modulator 35 to the light consolidating element 36. The light consolidating element 36 reflects the first viewing angle image having the second polarization direction so that the first viewing angle image is projected to the first projection lens 371. Similarly, the light consolidating element 36 reflects the second viewing angle image having the second polarization direction so that the second viewing angle image is projected to the second projection lens 372.

As shown in FIG. 3B, in the second time sequence, a light beam generated by the light source module 31 is also split by the first light splitting element 32 into the first polarized light beam and the second polarized light beam. At this point, the first sub-light valve unit 331 of the first light valve unit 33 is in the OFF status, and the second sub-light valve unit 332 is in the ON status. In other words, the first polarized light beam passing through the first sub-light valve unit 331 of the first light valve unit 33 is unchanged in polarization direction and formed into a third image light having the first polarization direction. The second polarized light beam passing through the second sub-light valve unit 332 of the first light valve unit 33 is changed in polarization direction and formed into a fourth image light having the first polarization direction.

Then, the third image light and the fourth image light propagate to the first light modulator 34 and the second light modulator 35 respectively and are transformed into a third viewing angle image and a fourth viewing angle image by the first light modulator 34 and the second light modulator 35 respectively. Finally, the third viewing angle image and the fourth viewing angle image are transferred by the first light modulator 34 and the second light modulator 35 to the light consolidating element 36. The light consolidating element 36 allows the third viewing angle image having the first polarization direction to pass therethrough so that the third viewing angle image is projected to the first projection lens 371. Similarly, the light consolidating element 36 allows the fourth viewing angle image having the second polarization direction to pass therethrough so that the fourth viewing angle image is projected to the second projection lens 372.

In brief, the first projection lens 371 and the second projection lens 372 can receive two images of different viewing angles in different time sequences so that a stereoscopic image can be seen by the user in any viewing zone (not shown) of the first projection lens 371 and the second projection lens 372 without the need of using any additional auxiliary device (e.g., a pair of glasses).

Figure 4A:
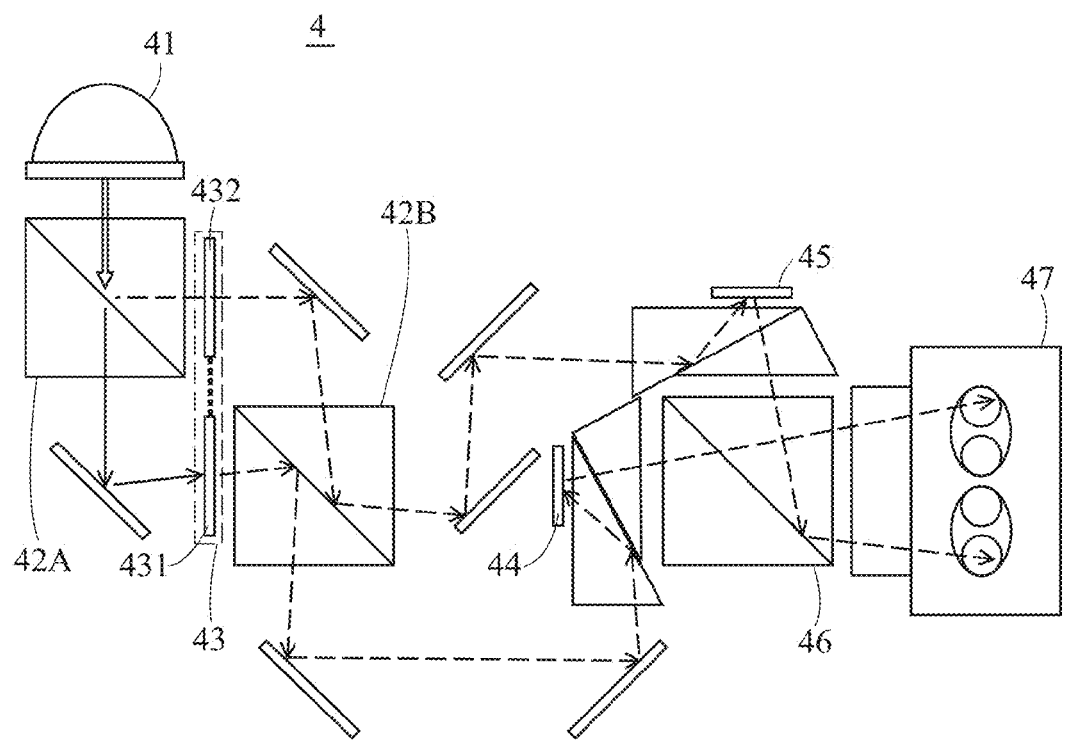
FIG. 4A is a schematic view illustrating a light path of a second embodiment of the present invention in the second time sequence.
Figure 4B:
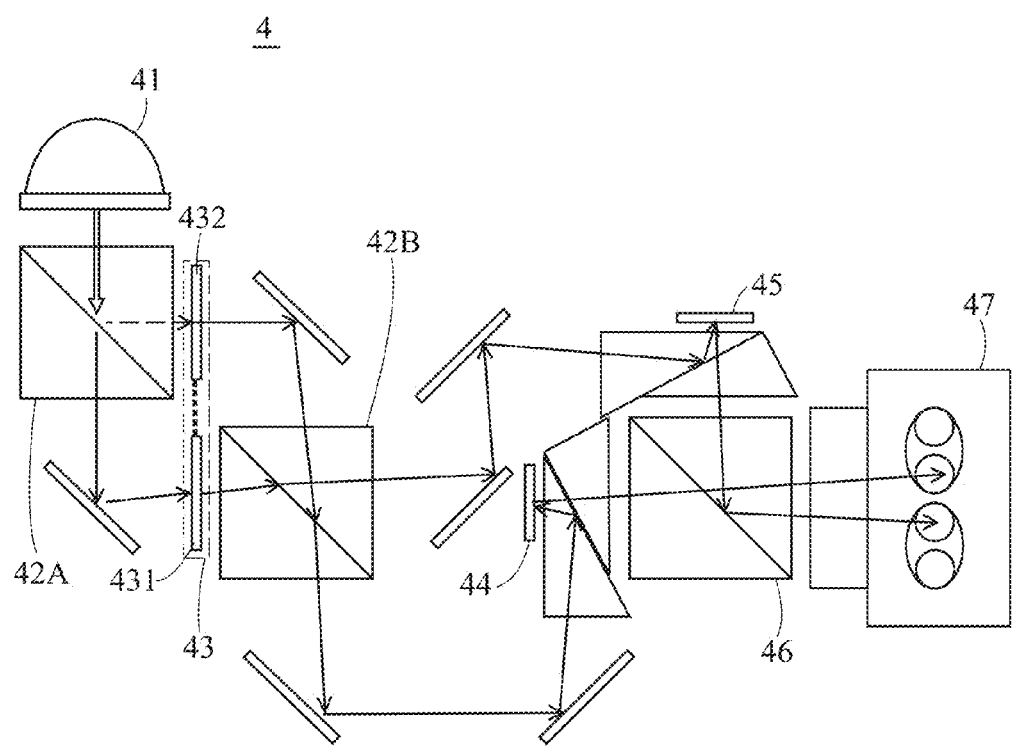
FIG. 4B is a schematic view illustrating a light path of the second embodiment of the present invention in the first time sequence.

Referring next to FIG. 4A and FIG. 4B, there are shown schematic views illustrating light paths of a projection apparatus 4 according to a second embodiment of the present invention in the first time sequence and the second time sequence respectively. This embodiment is a projection apparatus 4 for providing multiple viewing angle images, and the projection apparatus 4 comprises a light source module 41, a first light splitting element 42A, a second light splitting element 42B, a first light valve unit 43, a first light modulator 44, a second light modulator 45, a light consolidating element 46 and a first projection lens 47.

The projection apparatus 4 of this embodiment differs from the projection apparatus 3 of the first embodiment in that: the light consolidating element 46 of this embodiment is a total internal reflection cube (e.g., a total internal reflection prism); this embodiment further comprises a second light splitting element 42B, the first light valve unit 43 is disposed between the first light splitting element 42A and the second light splitting element 42B, and the first light splitting element 42A and the second light splitting element 42B are each a polarizing beam splitter; and the projection lens 47 of this embodiment has only a single projection lens.

As shown in FIG. 4A, the light source module 41 generates a light beam. After reaching the first light splitting element 42A, the light beam is split by the first light splitting element 42A into a first polarized light beam (shown by solid arrows) and a second polarized light beam (shown by dashed arrows). Likewise, in this embodiment, the light beam having the first polarization direction is a P polarized light that passes through a polarizing coating of the first light splitting element 42A, and the light beam having the second polarization direction is an S polarized light that is reflected by the polarizing coating of the first light splitting element 42A.

In the first time sequence, the first polarized light beam enters into the first sub-light valve unit 431 of the first light valve unit 43 that is in the ON status, and is formed into a first image light having the second polarization direction. Meanwhile, the second polarized light beam enters into the second sub-light valve unit 432, which is now in the OFF status, of the first light valve unit 43. In other words, the second sub-light valve unit 432 does not change the polarization direction of the second polarized light beam passing therethrough, so the second polarized light beam is formed into a second image light having the second polarization direction.

Then, the first image light having the second polarization direction enters into the second light splitting element 42B and is then reflected by two reflecting mirrors into the first light modulator 44. Similarly, the second image light having the second polarization direction enters into the second light splitting element 42B and is also reflected to the second light modulator 45. The first image light and the second image light are then transformed into a first viewing angle image and a second viewing angle image by the first light modulator 44 and the second light modulator 45 respectively. Finally, the first viewing angle image and the second viewing angle image are transmitted by the first light modulator 44 and the second light modulator 45 to the light consolidating element 46. The light consolidating element 46 reflects the first viewing angle image having the second polarization direction and allows the second viewing angle image having the second polarization direction to pass therethrough so that the first viewing angle image and the second viewing angle image are projected to the projection lens 47.

As shown in FIG. 4B, in the second time sequence, the first sub-light valve unit 431 is in the OFF status, and the first polarized light beam is unchanged in polarization direction and formed into a third image light having the first polarization direction. On the other hand, the second polarized light beam is transformed by the second sub-light valve unit 432, which is in the ON status, into a fourth image light having the first polarization direction. The third image light having the first polarization direction passes through the second light splitting element 42B (which only reflects light beams having the second polarization direction), and is reflected by the two reflecting mirrors into the first light modulator 44. Similarly, the fourth image light having the first polarization direction passes through the second light splitting element 42B to the second light modulator 45.

Then, the third image light and the fourth image light are transformed into a third viewing angle image and a fourth viewing angle image by the first light modulator 44 and the second light modulator 45 respectively. Finally, the third viewing angle image and the fourth viewing angle image are transmitted by the first light modulator 44 and the second light modulator 45 to the light consolidating element 46. The light consolidating element 46 allows the third viewing angle image having the first polarization direction to pass therethrough, and reflects the fourth viewing angle image having the first polarization direction so that the third viewing angle image and the fourth viewing angle image are projected to the projection lens 47. For other light beams of this embodiment, propagation and transformation thereof are similar to those of the first embodiment and, thus, will not be further described herein.

In brief, the first viewing angle image, the second viewing angle image, the third viewing angle image and the fourth viewing angle image of this embodiment all share the same lens. As compared to the first embodiment, this embodiment is advantageous in that, the design of the light paths is simple and there is no need to consider the problem of alignment. On the other hand, the use of two projection lenses in the first embodiment can achieve a desirable etendue and a high efficiency. Therefore, the two embodiments have respective advantages, and may be chosen or combined by the user according to different requirements.

Figure 5:
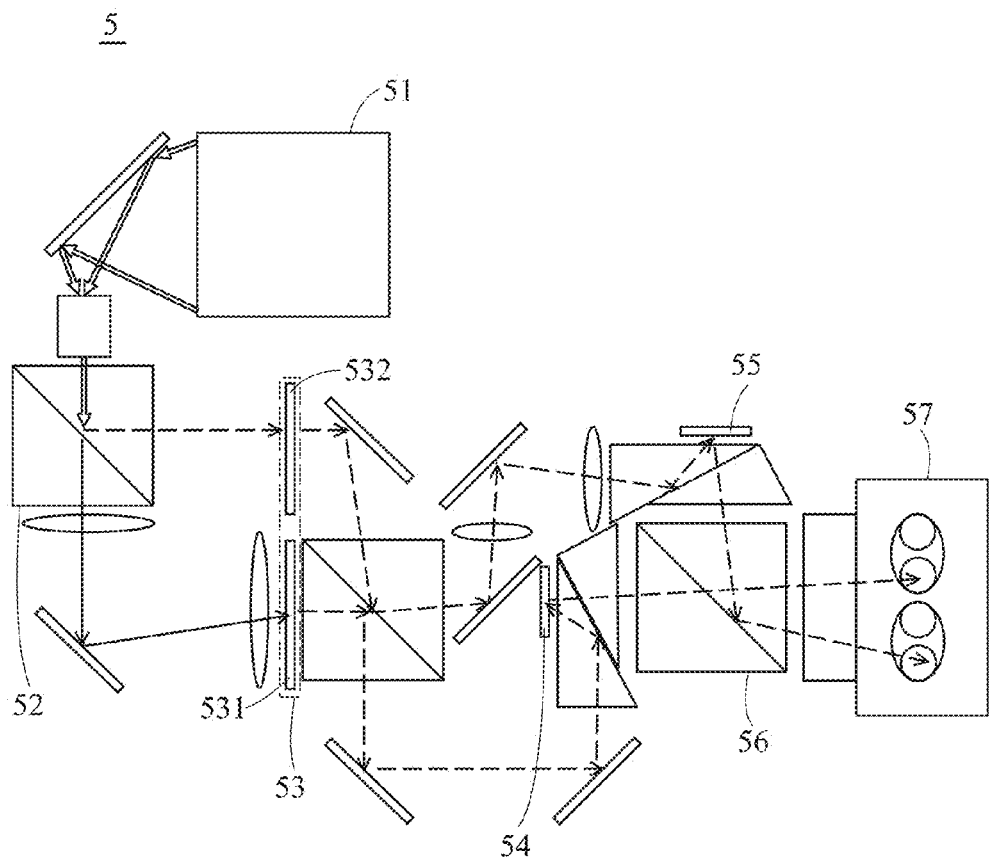
FIG. 5 is a schematic view illustrating a light path of a third embodiment of the present invention in the first time sequence.

Referring next to FIG. 5, there is shown a schematic view illustrating a light path of a third embodiment of the present invention in the first time sequence. A projection apparatus 5 of this embodiment also comprises a light source module 51, a first light splitting element 52, a second light splitting element (not shown), a first light valve unit 53, a first light modulator 54, a second light modulator 55, a light consolidating element 56 and a first projection lens 57. The first light valve unit 53 has a first sub-light valve unit 531 and a second sub-light valve unit 532. The projection apparatus 5 of this embodiment mainly differs from the projection apparatus 4 of the second embodiment in that: the light source module 51 of this embodiment is a solid-state light source (e.g., a blue laser).

As shown, in the first time sequence, a light beam generated by the light source module 51 enters into the first light splitting element 52 and is then split into a first polarized light beam (shown by solid arrows) and a second polarized light beam (shown by dashed arrows). Likewise, in this embodiment, the light beam having the first polarization direction is a P polarized light that passes through a polarizing coating of the first light splitting element 52, and the light beam having the second polarization direction is an S polarized light that is reflected by the polarizing coating of the first light splitting element 52.

Then, the first polarized light beam enters into the first sub-light valve unit 531 of the first light valve unit 53 that is in the ON status, and is formed into a first image light having the second polarization direction. Meanwhile, the second polarized light beam enters into the second sub-light valve unit 532, which is in the OFF status, of the first light valve unit 53 where the second polarized light beam is formed into a second image light with the polarization direction thereof remaining unchanged.

Then, the first image light and the second image light propagate to the first light modulator 54 and the second light modulator 55 respectively, and are then transformed by the first light modulator 54 and the second light modulator 55 into a first viewing angle image and a second viewing angle image respectively. Finally, the first viewing angle image and the second viewing angle image are transferred by the first light modulator 54 and the second light modulator 55 to the light consolidating element 56. The light consolidating element 56 allows the first viewing angle image having the second polarization direction to pass therethrough, and reflects the second viewing angle image having the second polarization direction so that the first viewing angle image and the second viewing angle image are projected to the first projection lens 57.

Propagation and transformation of the light beams of this embodiment in the second time sequence are similar to those of the second embodiment, and thus will not be further described herein.

Figure 6:
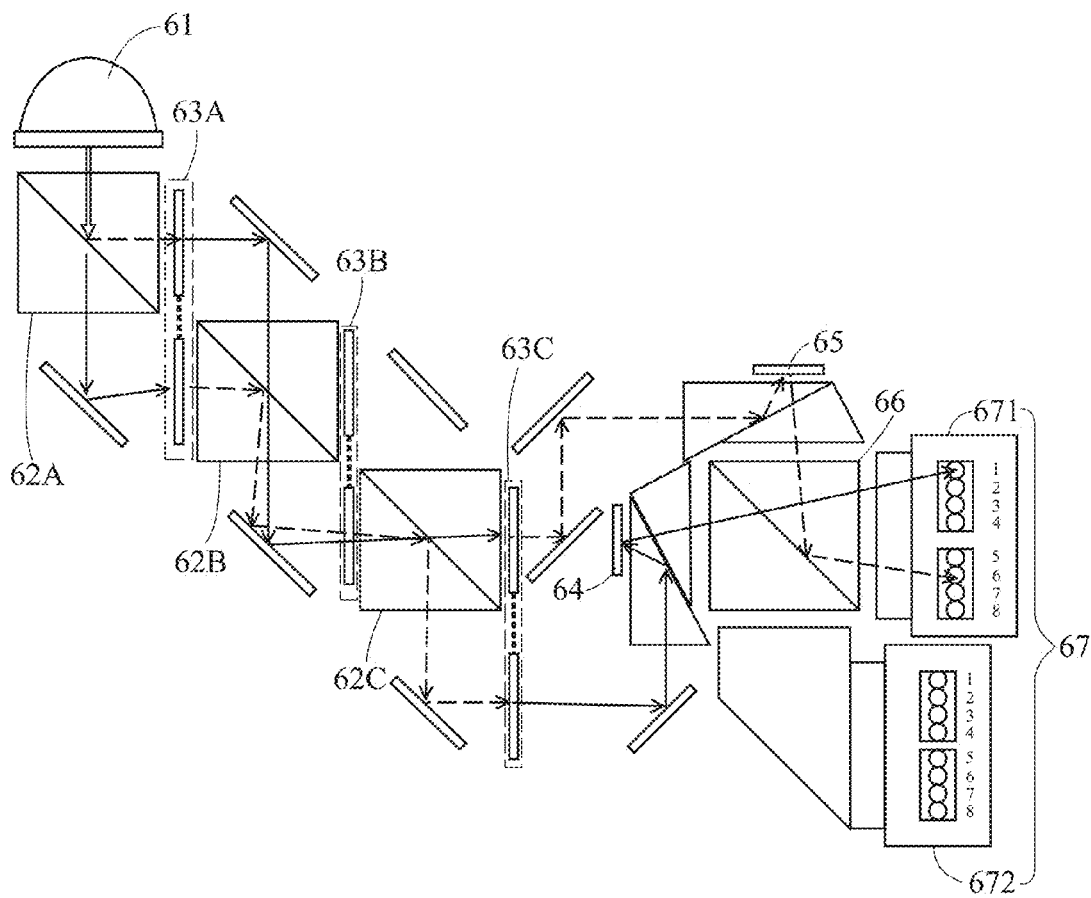
FIG. 6 is a schematic view illustrating a light path of a fourth embodiment of the present invention.

Refer to FIG. 6, FIG. 7A and FIG. 7B together. FIG. 6 is a schematic view illustrating a light path of a projection apparatus 6 according to a fourth embodiment of the present invention; and FIG. 7A and FIG. 7B are diagrams illustrating correspondence relationships between image positions of a first projection lens and a second projection lens of the projection apparatus 6 of FIG. 6 and switch statuses of light valve units respectively.

The projection apparatus 6 of this embodiment comprises a light source module 61, a first light splitting element 62A, a second light splitting element 62B, a third light splitting element 62C, a first light valve unit 63A, a second light valve unit 63B, a third light valve unit 63C, a first light modulator 64, a second light modulator 65, a light consolidating element 66 and a projection lens 67. The projection lens 67 comprises a first projection lens 671 and a second projection lens 672.

The first light valve unit 63A is disposed between the first light splitting element 62A and the second light splitting element 62B; the second light splitting element 62B is disposed between the first light valve unit 63A and the second light valve unit 63B; and the third light splitting element 62C is disposed between the second light valve unit 63B and the third light valve unit 63C.

The first light splitting element 62A, the second light splitting element 62B, the third light splitting element 62C and the light consolidating element 66 of this embodiment may each be a polarizing beam splitter. The first light valve unit 63A, the second light valve unit 63B and the third light valve unit 63C are each a liquid crystal display, a π-cell, a Ferro-electric liquid crystal (FLC), a Pockels cell, a Kerr shutter or a Faraday crystal.

Referring to FIG. 7A together, there is shown a list illustrating relationships between image forming positions in the first projection lens 671 and the light valve units, the first light modulator 64 and the second light modulator 65. The light valve units include the first light valve unit 63A, the second light valve unit 63B and the third light valve unit 63C. If the switch statuses of the light valve units are (1, 0, 1) in a certain time sequence, then it means that the first light valve unit 63A is in the ON status, the second light valve unit 63B is in the OFF status and the third light valve unit 63C is in the ON status. In other words, if the first light valve unit 63A and the third light valve unit 63C are turned on and the second light valve unit 63B is turned off, then a viewing angle image will be formed at the image position 1 and the image position 6 in the first projection lens 671 respectively.

Similarly, FIG. 7B is a list illustrating relationships between image forming positions in the second projection lens 672 and the light valve units, the first light modulator 64 and the second light modulator 65. If the switch statuses of the light valve units are (0, 1, 1) in a certain time sequence, then it means that the first light valve unit 63A is in the OFF status, the second light valve unit 63B is in the ON status and the third light valve unit 63C is in the ON status. In other words, if the second light valve unit 63B and the third light valve unit 63C are turned on and the first light valve unit 63A is turned off, then a viewing angle image will be formed at the image position 1 and the image position 6 in the second projection lens 672 respectively.

Hereinbelow, the operating process of the projection apparatus 6 according to the fourth embodiment of the present invention will be explained in detail with reference to FIG. 6. Different from the aforesaid embodiments, the operating process of the projection apparatus 6 of this embodiment will be described by defining time sequences according to the first light valve unit 63A, the second light valve unit 63B and the third light valve unit 63C. Defining time sequences in this way is only for convenience of description, but not to limit the operating sequence to be as shown in FIG. 7A or FIG. 7B. Another difference is that, the light valve units 63A, 63B, 63C of this embodiment each comprise a first sub-light valve unit and a second sub-light valve unit that operate in synchronization.

Referring to FIG. 6 again, at this point, the first light valve unit 63A and the third light valve unit 63C are in the ON status, and the second light valve unit 63B is in the OFF status. The light source module 61 generates a light beam, which is split by the first light splitting element 62A into a first polarized light beam (shown by solid arrows) and a second polarized light beam (shown by dashed arrows). Likewise, in this embodiment, the light beam having the first polarization direction is a P polarized light that passes through a polarizing coating of the first light splitting element 62A, and the light beam having the second polarization direction is an S polarized light that is reflected by the polarizing coating of the first light splitting element 62A.

Then, the first polarized light beam enters into the first light valve unit 63A and is transformed into a first image light having the second polarization direction. Then, the first image light having the second polarization direction enters into the second light splitting element 62B and is then reflected by the reflecting mirrors into the second light valve unit 63B. Because the second light valve unit 63B is now in the OFF status, the first image light having the second polarization direction is unchanged in polarization direction. After the first image light exits from the second light valve unit 63B, the first image light enters into the third light splitting element 62C and is reflected (at this point, the third light splitting element 62C reflects the first image light having the second polarization direction and allows the light beam having the first polarization direction to pass therethrough). The reflected first image light enters into the third light valve unit 63C where it is transformed into a first image light having the first polarization direction. Finally, the first image light enters into the first light modulator 64 to be transformed into a first viewing angle light. The first viewing angle light then propagates to the light consolidating element 66 and is reflected and projected to the image position 1 of the first projection lens 671.

Meanwhile, the second polarized light beam (shown by dashed arrows) is reflected into the first light valve unit 63A and formed into a second image light having the first polarization direction. The second image light having the first polarization direction passes through the second light splitting element 62B into the second light valve unit 63B. Because the second light valve unit 63B is now in the OFF status, the second image light having the first polarization direction that enters into the second light valve unit 63B is unchanged in polarization direction. After the second image light exits from the second light valve unit 63B, the second image light passes through the third light splitting element 62C and is then transformed by the third light valve unit 63C into a second image light having the second polarization direction. Finally, the second image light enters into the second light modulator 65 to be transformed into a second viewing angle light. The second viewing angle light then propagates to the light consolidating element 66 and is projected to the image position 6 of the first projection lens 671.

Operations of the optical elements corresponding to other image positions in this embodiment are similar to those of the aforesaid embodiments, and thus will not be further described herein.

Figure 8:
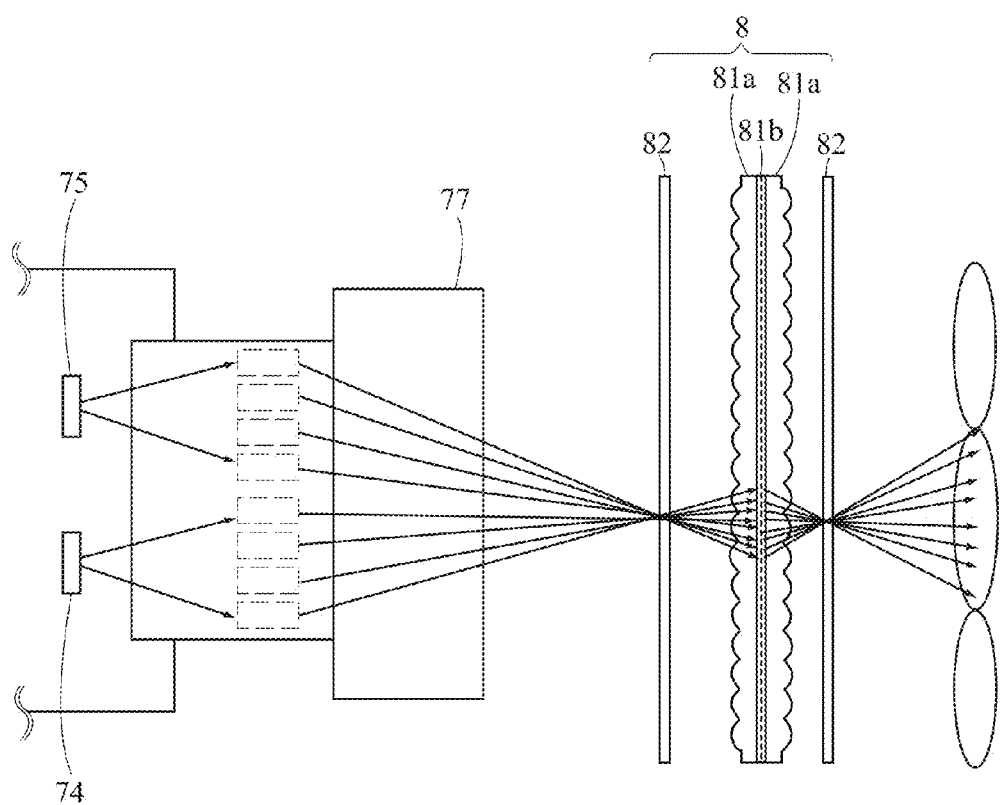
FIG. 8 is a schematic view illustrating use of the projection apparatus of the present invention in combination with a display screen.

Referring to FIG. 8, there is shown a schematic view illustrating use of the projection apparatus of the present invention in combination with a display screen. It shall be appreciated that, only a part of the projection apparatus is illustrated, and positions of the first light modulator 74 and the second light modulator 75 inside the projection apparatus are shown only for purpose of illustration but not to limit the actual arrangement. For convenience of understanding, the projection apparatus and the display screen 8 are exaggerated deliberately. In practical operations, the display device 8 may be used with the projection apparatus of the fourth embodiment or other embodiments of the present invention. Furthermore, the projection apparatus may also be a rear-projection projector.

The display screen 8 comprises a double lenticular lens, which has two lenticular lens sheets 81a and an all-direction diffuser 81b disposed between the two lenticular lens sheets 81a. At an outer side of each of the two lenticular lens sheets 81a is disposed an outer plate 82.

In detail, the first light modulator 74 and the second light modulator 75 are adapted to form eight viewing angle images for projection into the projection lens 77. Then, by the all-direction diffuser 81b having the all-direction diffusion function, the eight viewing angle images from the projection apparatus can be projected to a reference plane.

Furthermore, other implementations of the display screen of the present invention are also possible. For example, the display screen comprises a Fresnel lens and a vertical diffuser. After the multiple viewing angle images enter into the display screen of this example, the vertical diffuser diffuses the multiple viewing angle images in a vertical direction. Then, the viewing angle images are converged by the Fresnel lens onto adjacent viewing zones to form multiple viewing angle images respectively. In other words, the viewer can see different viewing angle images on the reference plane.

Figure 9:
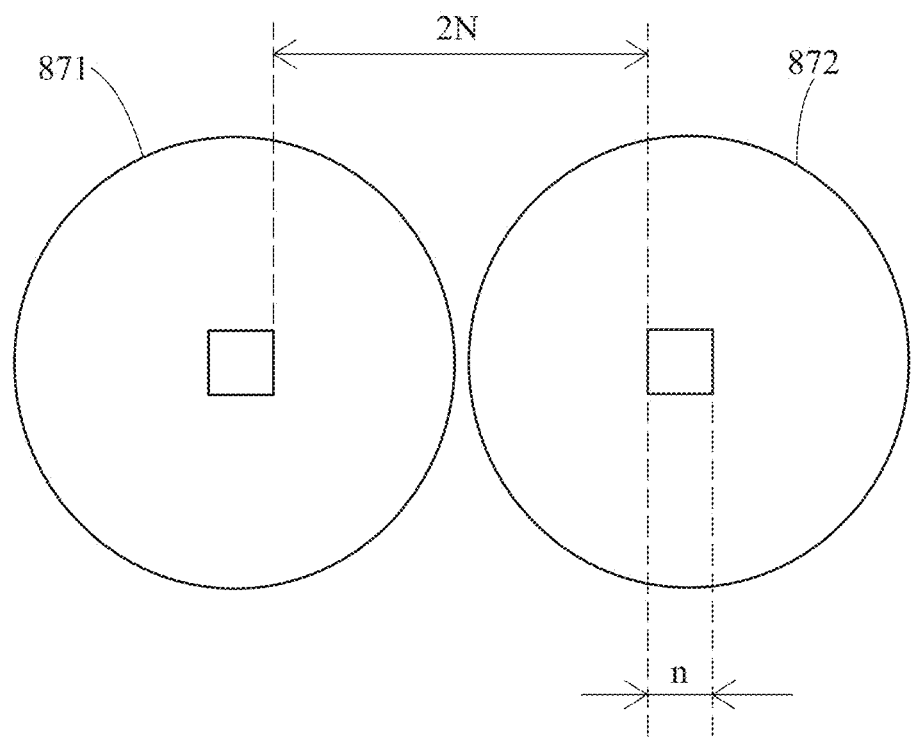
FIG. 9 is a schematic view illustrating relative relationships between apertures and exit pupils of the projection lenses.
Figure 10:
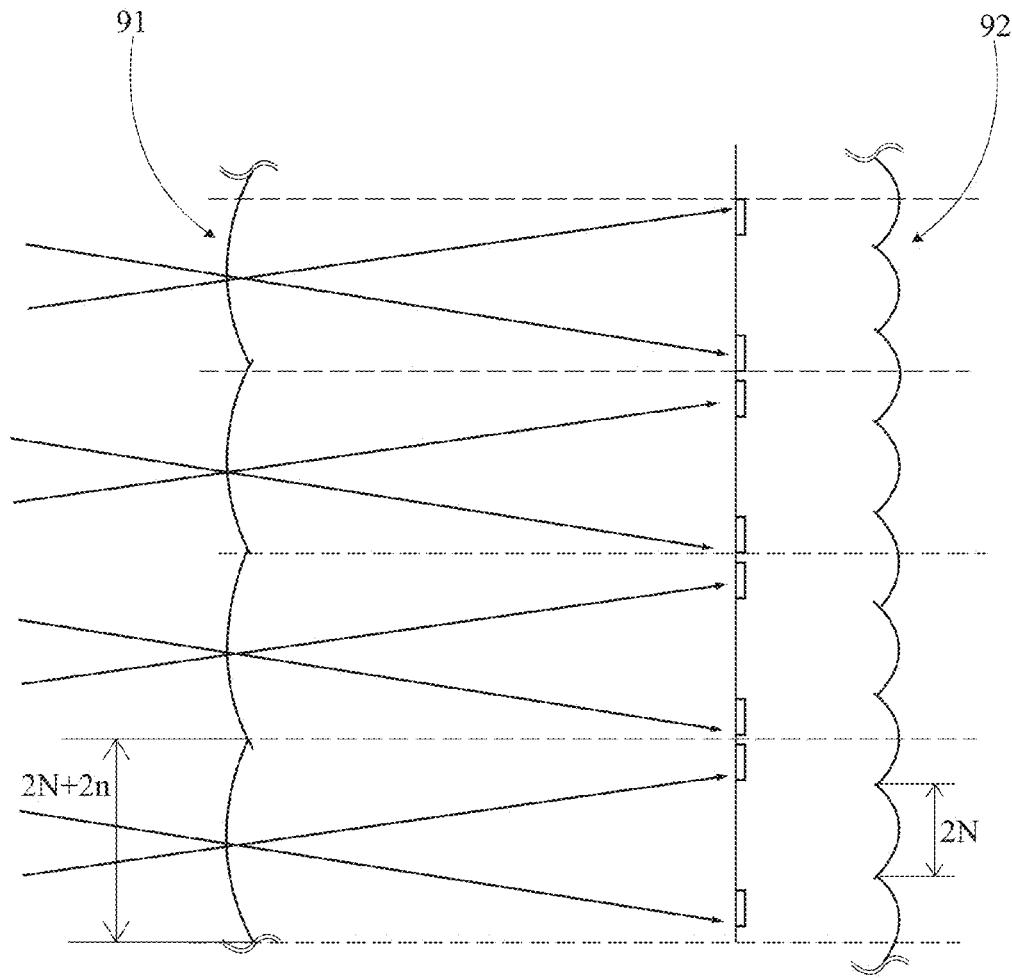
FIG. 10 is a partially enlarged view of a display screen used with two projection lenses.

Finally, referring to FIG. 9 and FIG. 10, FIG. 9 is a schematic view illustrating relative relationships between apertures and exit pupils of projection lenses, and FIG. 10 is a partially enlarged view of a display screen used with the two projection lenses. A pupil distance between the first projection lens 871 and the second projection lens 872 that are adjacent to each other is defined as 2N, and a pupil size is defined as n. In this case, a light exit surface 92 of the display screen 9 used with the two projection lenses must have a pitch of 2N, and then a light entrance surface 91 of the display screen 9 has a pitch of (2N+2n) or a multiple thereof.

According to the above descriptions, the projection apparatus of the present invention uses a light splitting element to split a light beam from the light source module into light beams of different polarization directions, then uses at least one light valve unit to transmit the light beams of different polarization directions to a first light modulator and a second light modulator respectively, and finally uses the first light modulator and the second light modulator to transform the light beams into a first viewing angle image and a second viewing angle image. Thereby, the user can receive different viewing angle images in different time sequences to obtain a stereoscopic image without the need of using any additional auxiliary device (e.g., a pair of glasses). With the aforesaid arrangement and application, a projection apparatus that features a high light utilization factor, a low cost, a simplified optical arrangement and a high resolution and that eliminates the need of a mechanical rotary member can be provided.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projection apparatus for providing multiple viewing angle images, comprising:
   a light source module for providing a light beam;
   a first light splitting element, dividing the light beam into a first polarized light beam and a second polarized light beam;
   a first light valve unit, wherein in a first time sequence, the first light valve unit transforms the first and the second polarized light beams into a first and a second image light respectively, and in a second time sequence, the first light valve unit transforms the first and the second polarized light beams into a third and a fourth image light respectively;
   a first light modulator for receiving the first image light in the first time sequence and for receiving the third image light in the second time sequence, wherein the first light modulator transforms the first and the third image lights into a first viewing angle image and a third viewing angle image respectively;
   a second light modulator for receiving the second image light in the first time sequence and for receiving the fourth image light in the second time sequence, wherein the second light modulator transforms the second and the fourth image lights into a second viewing angle image and a fourth viewing angle image respectively; and
   a light consolidating element for projecting the first and the second viewing angle images in the first time sequence, and for projecting the third and the fourth viewing angle images in the second time sequence.

2. The projection apparatus as claimed in claim 1, further comprising a second light splitting element, the first light valve unit being disposed between the first light splitting element and the second light splitting element, wherein the first, the second, the third and the fourth image lights transmit through the second light splitting element into the first and the second light modulators respectively.

3. The projection apparatus as claimed in claim 2, further comprising a projection lens, wherein the first, the second, the third and the fourth viewing angle images are projected to the projection lens.

4. The projection apparatus as claimed in claim 3, wherein the first light valve unit comprises a first sub-light valve unit and a second sub-light valve unit which operates in reverse to the first sub-light valve unit.

5. The projection apparatus as claimed in claim 2, further comprising a third light splitting element, a second light valve unit and a third light valve unit, wherein the second light splitting element is disposed between the first light valve unit and the second light valve unit, the third light splitting element is disposed between the second light valve unit and the third light valve unit, and the first, the second, the third and the fourth image lights sequentially transmit through the second light spitting element and the third light spitting element into the first light modulator and the second light modulator respectively.

6. The projection apparatus as claimed in claim 5, further comprising a first projection lens and a second projection lens, wherein in the first time sequence, the light consolidating element projects the first viewing angle image and the second viewing angle image to the first and the second projection lenses respectively; and in the second time sequence, the light consolidating element projects the third viewing angle image and the fourth viewing angle image to the first and the second projection lenses respectively.

7. The projection apparatus as claimed in claim 6, further comprising a display screen on which the first, the second, the third and the fourth viewing angle images are projected, wherein the display screen comprises a double lenticular lens, which has two lenticular lens sheets and an all-direction diffuser disposed therebetween.

8. The projection apparatus as claimed in claim 6, wherein the first light valve unit is a liquid crystal display, a π-cell, a Ferro-electric liquid crystal (FLC), a Pockels cell, a Kerr shutter or a Faraday crystal.

9. The projection apparatus as claimed in claim 5, wherein the first, the second and the third light splitting elements are each a polarizing beam splitter.

10. The projection apparatus as claimed in claim 1, further comprising a first projection lens and a second projection lens, wherein in the first time sequence, the light consolidating element projects the first viewing angle image and the second viewing angle image to the first and the second projection lenses respectively; and in the second time sequence, the light consolidating element projects the third viewing angle image and the fourth viewing angle image to the first and the second projection lenses respectively.

11. The projection apparatus as claimed in claim 10, further comprising a display screen on which the first, the second, the third and the fourth viewing angle images are projected, wherein the display screen comprises a double lenticular lens, which has two lenticular lens sheets and an all-direction diffuser disposed therebetween.

12. The projection apparatus as claimed in claim 10, wherein the first light valve unit is a liquid crystal display, a π-cell, a Ferro-electric liquid crystal (FLC), a Pockels cell, a Kerr shutter or a Faraday crystal.

13. The projection apparatus as claimed in claim 1, wherein the light consolidating element is a total internal reflection cube.

14. The projection apparatus as claimed in claim 1, wherein the first light valve unit is a liquid crystal display, a π-cell, a Ferro-electric liquid crystal (FLC), a Pockels cell, a Kerr shutter or a Faraday crystal.

15. The projection apparatus as claimed in claim 1, wherein the light modulators are digital micro-mirror devices or liquid crystal devices.

16. The projection apparatus as claimed in claim 1, wherein the projection apparatus is a rear-projection projector.

* * * * *